United States Patent [19]

Killeen et al.

[11] 4,079,010
[45] Mar. 14, 1978

[54] CONTINUOUS SCREENING OR FILTERING MACHINE

[76] Inventors: Walter H. Killeen; Walter H. Killeen, Jr., both of 1519 Eleonore St., New Orleans, La. 70115

[21] Appl. No.: 749,524

[22] Filed: Dec. 10, 1976

[51] Int. Cl.² .................................................. B01D 33/04
[52] U.S. Cl. .................................... 210/400; 210/456
[58] Field of Search ............ 210/400, 77, 456, 497 R; 162/348; 209/307

[56] References Cited

U.S. PATENT DOCUMENTS 2,619,232  11/1952  Parsons et al. ................... 210/400 X
3,537,584  11/1970  MacDonald et al. ........... 210/456 X

FOREIGN PATENT DOCUMENTS 497,706  12/1950  Belgium .............................. 210/400
825,571   3/1938  France ................................ 210/400

Primary Examiner—William A. Cuchlinski, Jr.
Attorney, Agent, or Firm—Clarence A. O'Brien; Harvey B. Jacobson

[57] ABSTRACT

A continuous screening or filtering machine has a porous conveyor supported on a perforated support surface for separating a mixture of a solid material and a liquid into its constituents by permitting the liquid to pass through the conveyor and support member.

4 Claims, 6 Drawing Figures

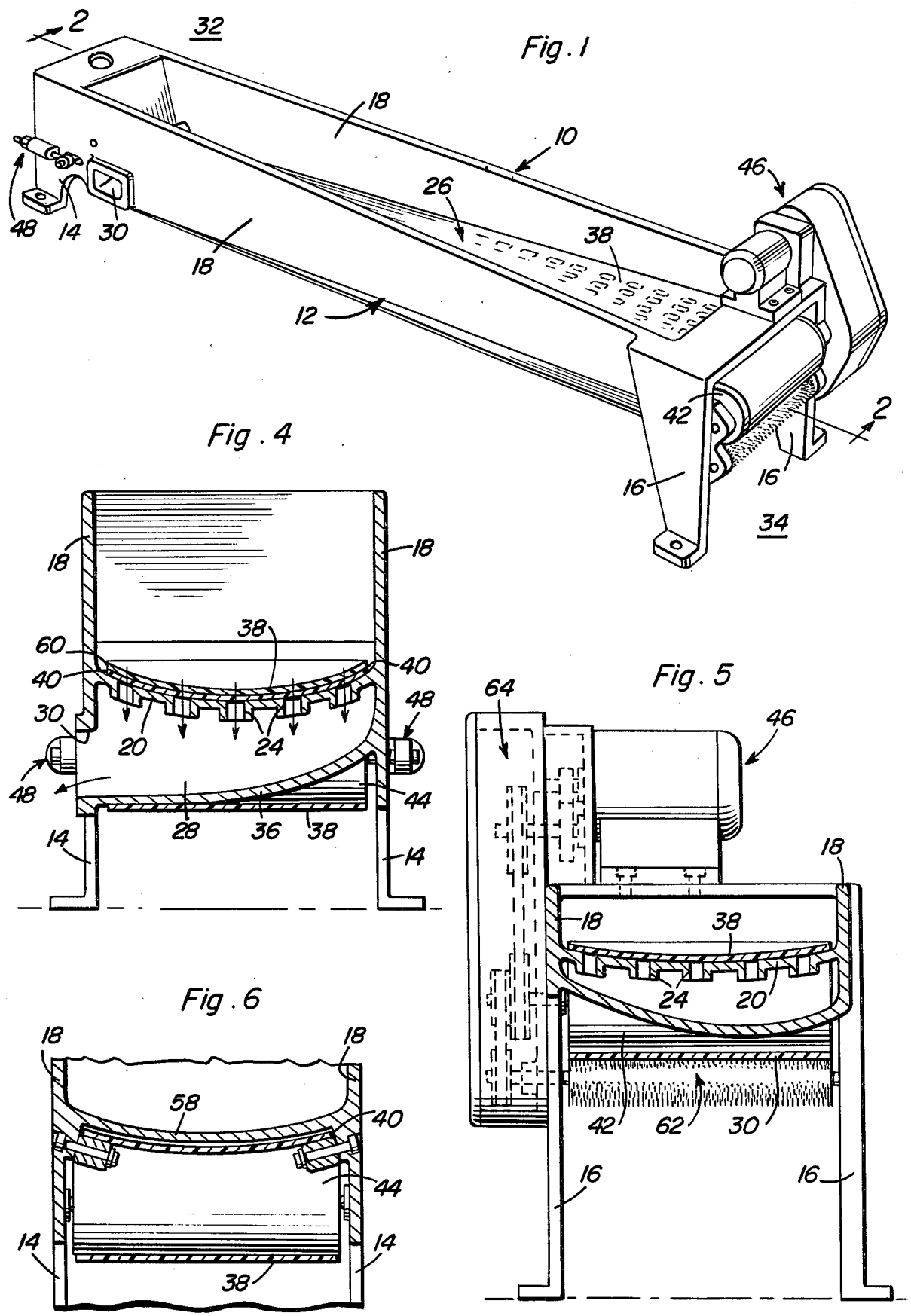

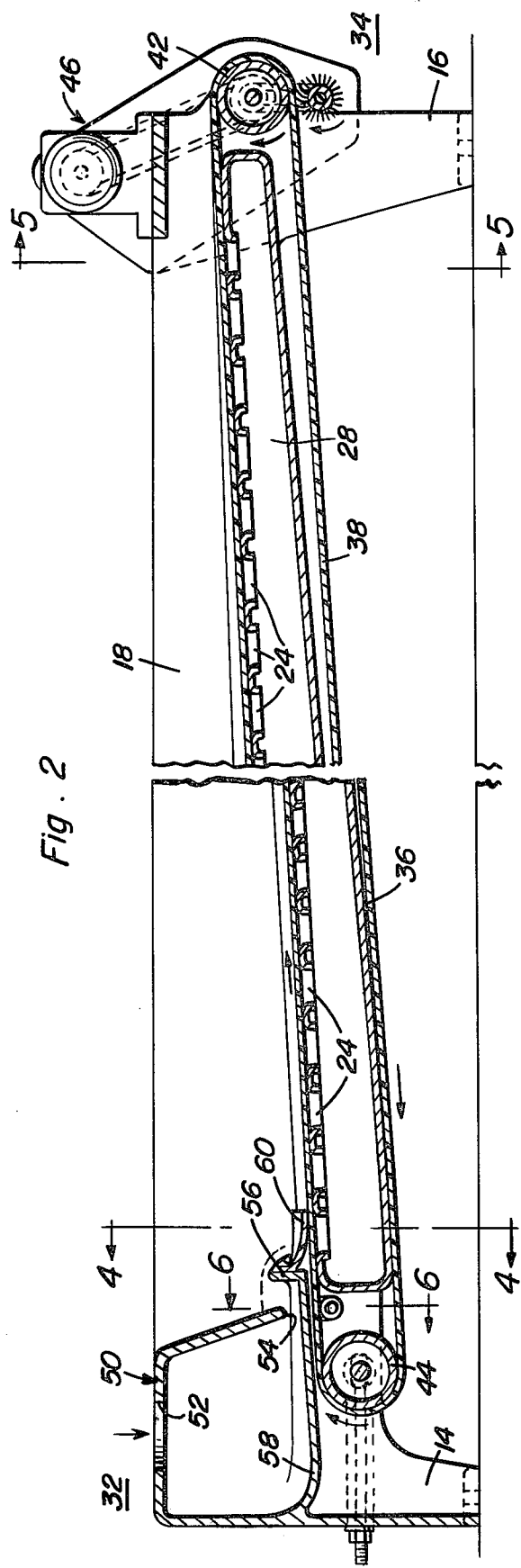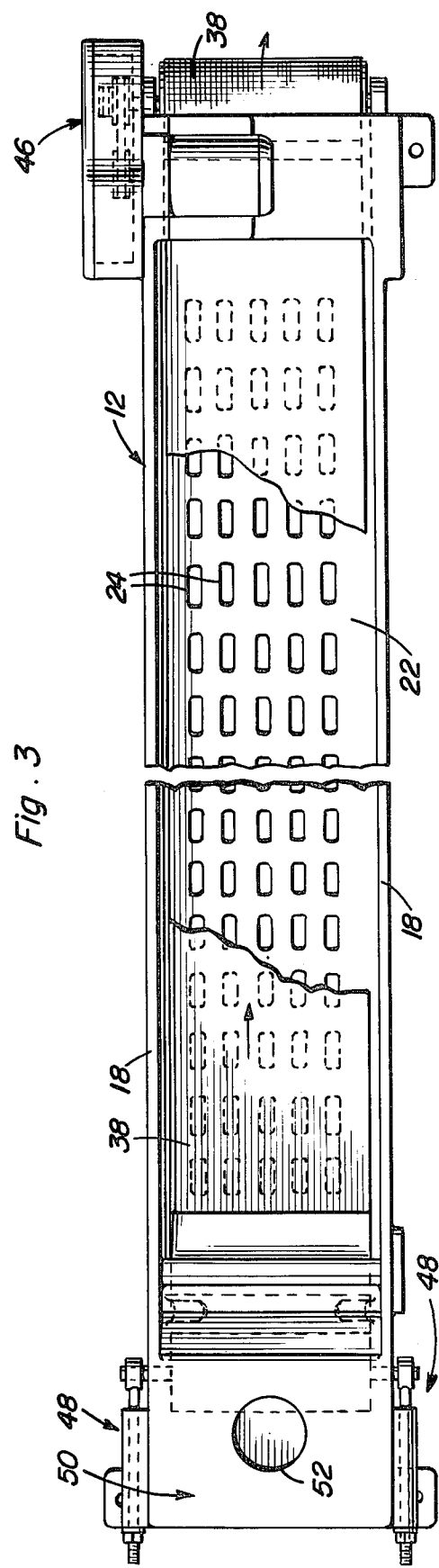

CONTINUOUS SCREENING OR FILTERING MACHINE

BACKGROUND OF THE INVENTION

1. Field of the Invention

This invention relates generally to apparatus for separating a mixture of a solid material and a liquid into its constituents, and particularly to a machine for continuously filtering or screening solid material from a mixture of such material with a neutral or ionic liquid.

2. Description of the Prior Art

There is need for a separating device capable of handling high volumes of low consistency mixtures such as found in paper or insulation board mills, waste treatment plants, and the like. These mixtures generally consist of a solid material together with a neutral or ionic liquid, with the ratio of solids to liquids being rather low.

Devices have been proposed for separating various waste materials, usually by a screening process. Examples of such devices can be found in U.S. Pat. Nos.: 965,486, issued July 26, 1910 to G. L. Putt; 2,529,882, issued Nov. 14, 1950 to C. F. Mittman; and 2,917,245, issued Dec. 15, 1959 to R. W. Polleys. These known separating devices, however, are intended to handle high consistency mixtures.

SUMMARY OF THE INVENTION

It is an object of the present invention to provide a separating device capable of handling low consistency mixtures of a solid material and a liquid.

It is another object of the present invention to provide a continuous screening, or filtering, machine capable of handling a solid and liquid mixture containing a high percentage of liquid.

It is a still further object of the present invention to provide a continuous screening or filtering machine which prevents unwanted leakage of the mixture throughout the separating process carried forth on the machine.

These and other objects are achieved according to the present invention by providing continuous screening or filtering apparatus having: a frame including a support member forming a perforated, substantially horizontal support surface; and a porous conveyor having a run arranged on the support surface for receiving a mixture to be separated and permitting the liquid in the mixture to pass through the conveyor and the support member for separation of the liquid from the solids of the mixture.

The frame is further provided with a cavity partially formed by the support member, and with an opening in communication with the cavity for discharging separated liquid from the frame. The frame also includes a loading station and a discharge station, with the support member and conveyor arranged extending between these two stations. The support member is sloped upwardly from the loading station to the discharge station, while the frame has a lower wall partially forming the cavity and sloped with the support member and also sloped transversely of the extent of the support member between its loading station and discharge station so as to extend downwardly toward the discharge opening. The latter is advantageously disposed adjacent the loading station.

The support member is curved transversely of the extent of the member between the loading and discharge stations, with the support surface being thus troughed. By using an endless screen belt as the porous conveyor, the longitudinal peripheral edges of the belt are caused to be effectively sealed by the troughing of the belt on the support surface. More specifically, the troughing of the belt will cause the mixture disposed on the belt to be retained between the edges of the belt in order to prevent the mixture from flowing beyond the edges and down under the run of the endless belt passing over the support member.

A trap preferably forms the loading station. This trap is formed by a hollow housing provided with an upwardly directed inlet aperture and a lower outlet aperture, with an upstanding lip being disposed adjacent the outlet aperture and displaced therefrom toward the discharge station of the frame for forming a weir.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of mixture separating apparatus according to the present invention.

FIG. 2 is an enlarged, fragmentary, sectional view taken generally along the line 2—2 of FIG. 1. FIG. 3 is a fragmentary, top plan view showing the apparatus of FIGS. 1 and 2.

FIG. 4 is an enlarged, sectional view taken generally along the line 4—4 of FIG. 2.

FIG. 5 is an enlarged, sectional view taken generally along the line 5—5 of FIG. 2.

FIG. 6 is an enlarged, fragmentary, sectional view taken generally along the line 6—6 of FIG. 2.

DESCRIPTION OF THE PREFERRED EMBODIMENT

Referring now more particularly to the FIGS. of the drawings, apparatus according to the invention for continuously separating the constituents of a mixture of a solid material and a neutral or ionic liquid includes a frame 10 in the form of an elongated body 12 supported by legs 14 and 16. Sidewalls 18 extend substantially vertically in spaced relation to form a hollow interior to the elongated body 12, while extending along the bottom of this hollow interior partially formed by sidewalls 18 is a support member 20 forming a support surface 22 provided with a plurality of perforations 24. As can be readily seen from the drawings, although support member 20 is generally planar and slopes over its extent along body 12, the transverse section of member 20 is substantially horizontal. A porous conveyor 26 is arranged on support surface 22 for receiving a mixture to be separated and permitting the liquid in the mixture to pass through conveyor 26 and support member 20, by means of perforations 24, for separation of the liquid from the solids contained in the mixture.

Frame 10 is further provided with a cavity 28 partially formed by sidewalls 18 and support member 20 and with an opening 30 in communication with cavity 28 for discharging separated liquid from body 12.

Frame 10 also includes a loading station 32 and a discharge station 34, with support member 20 and conveyor 26 being arranged extending between these stations 32 and 34, and with the support member 20 being sloped upwardly from loading station 32 to discharge station 34. Body 12 of frame 10 further includes a lower wall 36 of generally arcuate configuration arranged partially forming cavity 28 and sloped with the support member 20 and transversely of the extent of support member 20 between the loading station 32 and the discharge station 34 so as to extend downwardly toward opening 30. The latter is disposed adjacent the loading station 32 so as to receive all of the liquid passing through the perforations 24 of support member 20 and being collected in cavity 28.

As can be readily seen from the drawings, support member 20 is progressively curved transversely of its longitudinal extent between stations 32 and 34 so as to provide a support surface 22 which is troughed deeper at station 32 than at station 34.

Conveyor 26 includes an endless screen belt 38 of conventional construction and having a pair of substantially parallel, longitudinally extending, peripheral edges 40. The trough formed by support surface 22 causes edges 40 to be sealed relative to the heavily liquid mixture deposited on belt 38 at loading station 32. More specifically, the curvature imparted to belt 38 by support surface 22 will cause the mixture deposited on belt 38 to be retained beneath the level of the edges 40 of belt 38 in order to prevent the mixture from flowing over the edges 40 and beneath belt 38 without first being filtered by the belt 38 itself.

Conveyor 26 also includes a head pulley 42, which is preferably crowned in order to facilitate tracking of belt 38, and a tail pulley 44. Pulleys 42 and 44 are arranged at the discharge station 34 and loading station 32, respectively. A conventional motor assembly 46 is mounted on frame 10 adjacent discharge station 34 for rotating head pulley 42 and causing movement of belt 38 by force of friction so that belt 38 will move clockwise as seen in FIG. 2.

Take-up bearing arrangements 48 are associated with tail pulley 44 for supporting pulley 44 and permitting obtainment of proper tension of belt 38 as well as assuring proper tracking of belt 38. As can be seen, the arrangements 48 are of a conventional construction so as to provide a resilient mounting of pulley 44 under a predetermined tension.

Frame 10 further includes a trap forming the loading station 32 and including a hollow housing 50 provided with an upwardly directed inlet aperture 52 and a lower, laterally directed outlet aperture 54. An upstanding lip 56 is disposed immediately adjacent conveyor 26, and adjacent outlet aperture 54 in the direction toward discharge station 34 for forming a weir. This lip 56 extends entirely across conveyor 26 from bottom wall 58 which itself extends outwardly beyond the sloping sidewall of housing 50 which cooperates with wall 58 to form opening 54. This water trap thus formed by housing 50 neutralizes lateral forces which would otherwise be introduced by the mixture being screened so as to prevent the belt 38 from drifting away from the center line of the machine, which drifting can destroy or severely damage the belt 38. In addition to the lateral forces which could be formed by the impinging mixture, and which is eliminated by the trap which includes the weir formed by lip 56, drift of belt 38 can be caused as well by very slight inaccuracies in the machine itself. The crowned head pulley 42, which is larger in diameter at its center than at its ends, and the tail pulley 44 being provided with take-up bearing arrangements 48, will compensate for any drift which would otherwise be caused by slight errors in screen construction or roller misalignment.

A flap 60, in the form of a piece of resilient material constructed from a natural or synthetic rubber and the like, is provided extending from lip 56 to the surface of belt 38 in order to prevent drainage of the mixture downwardly along the surface of belt 38 toward the tail pulley 44.

Desirably, a cleaning roller 62 is mounted beneath conveyor belt 38 adjacent the head pulley 42 for cleaning belt 38 immediately after the solid material is discharged from belt 38 at discharge station 34. Further, a suitable cover 64 may be disposed over the arrangement of pulleys and belts disposed between the output of motor assembly 46 and the shafts of head pulley 42 and cleaning roller 62 provided for rotating the pulley 42 and roller 62. By connecting a belt between pulley 42 and roller 62 for driving the latter, roller 62 will rotate in the same direction as pulley 42.

As can be appreciated from the above description and from the drawings, a separating machine according to the present invention is capable of utilizing a multi-function one piece frame, which construction greatly reduces construction costs and represents a sizable advantage over conventional separating devices. The use of drainage by a screen passing over a perforated member also has the advantage of more complete removal of liquid from the bottom of the screen. Further, low cost corrosion resistant material, such as polymer resin, can be employed on all parts of the apparatus which come in contact with the liquid, thus reducing maintenance and prolonging life for the machine. In particular, the great capacity of apparatus according to the invention is important. Small units used in tests have handled in excess of 3000 gallons per minute of waste.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. Apparatus for continuously separating the constituents of a mixture of a solid material and a liquid, comprising, in combination:
   (a) a frame including a support member forming a perforated support surface; and
   (b) porous conveyor means arranged on the support surface for receiving a mixture to be separated and permitting the liquid to pass through the conveyor means and the support member for separation of the liquid from the solid material of the mixture, the frame being further provided with a cavity partially formed by the support member, the frame also including a pair of spaced, substantially parallel sidewalls also partially forming the cavity, and the frame still further being provided with an opening in one of the sidewalls, which opening is in communication with the cavity for draining liquids separated from the mixture out of the frame, the frame including a loading station and a discharge station, the support member and conveyor means being arranged extending between the loading station and the discharge station, with the support member being sloped upwardly from the loading station to the discharge station, and the frame further including a lower wall partially forming the cavity and sloped with the support member and transversely of the extent of the support member between the loading station and the discharge station toward the opening, the opening being disposed adjacent the loading station, the support member being progressively curved transversely of the longitudinal extent of the support member between the loading station and the discharge station, with the support surface being thus troughed deeper at the loading station than at the discharge station.

2. Apparatus as defined in claim 1, wherein the conveyor means is an endless screen belt having longitudinally extending peripheral edges, and the trough formed on the support surface causing the edges to be sealed relative to the mixture on the belt.

3. Apparatus as defined in claim 1, wherein the frame further includes a trap forming the loading station, the trap comprising:
 (1) a hollow housing provided with an upwardly directed inlet aperture and a lower laterally directed outlet aperture; and
 (2) an upstanding lip disposed adjacent the outlet aperture in the direction toward the discharge station for forming a weir.

4. Apparatus as defined in claim 3, wherein the conveyor means is an endless screen belt having longitudinally extending peripheral edges, and the trough formed on the support surface causing the edges to be sealed relative to the mixture on the belt.

* * * * *